US006993185B2

United States Patent
Guo et al.

(10) Patent No.: US 6,993,185 B2
(45) Date of Patent: Jan. 31, 2006

(54) METHOD OF TEXTURE-BASED COLOR DOCUMENT SEGMENTATION

(75) Inventors: Jinhong Katherine Guo, West Windsor, NJ (US); Yuan Cheng, Piscataway, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 539 days.

(21) Appl. No.: 10/231,670

(22) Filed: Aug. 30, 2002

(65) Prior Publication Data

US 2004/0042659 A1   Mar. 4, 2004

(51) Int. Cl.
G06K 9/34 (2006.01)
G06K 9/00 (2006.01)

(52) U.S. Cl. .................................... 382/176; 382/164
(58) Field of Classification Search ............... 382/162, 382/164, 165, 168, 173, 176, 191, 199, 224, 382/225, 260, 266, 274, 283; 358/2.1, 3.06, 358/462, 517, 522, 523; 345/600; 707/517–521, 707/531; 715/517–521, 531
See application file for complete search history.

(56) References Cited

U.S. PATENT DOCUMENTS

| 5,745,600 | A | * | 4/1998 | Chen et al. .................. 382/218 |
| 5,748,780 | A | | 5/1998 | Stolfo |
| 5,799,112 | A | | 8/1998 | de Queiroz et al. |
| 5,848,185 | A | | 12/1998 | Koga et al. |
| 5,892,842 | A | * | 4/1999 | Bloomberg .................. 382/173 |
| 5,987,459 | A | | 11/1999 | Swanson et al. |
| 6,006,226 | A | | 12/1999 | Cullen et al. |
| 6,006,240 | A | * | 12/1999 | Handley ..................... 715/510 |
| 6,070,133 | A | | 5/2000 | Brewster et al. |
| 6,236,745 | B1 | | 5/2001 | Chen et al. |
| 6,393,150 | B1 | * | 5/2002 | Lee et al. .................... 382/176 |
| 6,597,808 | B1 | * | 7/2003 | Guo et al. ................... 382/173 |
| 6,633,411 | B1 | * | 10/2003 | Rao et al. .................... 358/2.1 |
| 6,731,775 | B1 | * | 5/2004 | Ancin ......................... 382/100 |
| 6,895,552 | B1 | * | 5/2005 | Balabanovic et al. ........ 715/513 |
| 2004/0042659 | A1 | * | 3/2004 | Guo et al. ................... 382/176 |

OTHER PUBLICATIONS

Deng, Shulan: Latifi, Shahram and Regentova, Emma, "Document Segmentation Using Polynomial Spline Wavelets," Journal of Pattern Recognition 34 (2001), pp. 2533-2545.

(Continued)

Primary Examiner—Andrew W. Johns
Assistant Examiner—Amir Alavi
(74) Attorney, Agent, or Firm—Amster, Rothstein & Ebenstein LLP

(57) ABSTRACT

A method for segmenting a color document into regions of text and halftone discriminates between text and halftone by examining the texture of the document. A color document is digitized, and a color space transform is preferably applied to the digitized document. The texture of the document is identified and a noise reduction step is preferably applied. Bounding boxes (blocks) within the document are identified and then the areas within the bounding boxes are classified as either text or halftone. Two alternative methods are described for examining the document texture. In the first method, a windowing operation is applied to either an intensity image or a color difference image. In the second method, a wavelet transform step combined with Fuzzy K-Mean clustering is applied. Bounding boxes are classified as either text or halftone based upon the relative periodicity of a horizontal or vertical (or both) histogram of each bounding box.

18 Claims, 9 Drawing Sheets

OTHER PUBLICATIONS

Garcia, C.; Zikos, G. and Tziritas, G., "Face Detection in Color Images Using Wavelet Packet Analysis," IEEE ICMCS, vol. 1 (1999), pp. 703-708.

Ohta, Yu-Ichi; Kanade, Takeo and Sakai, Toshiyuki, "Color Information for Region Segmentation," Computer Graphics and Image Processing 13 (1980), pp. 222-241.

Chang, Tianhorng and Kuo, C.-C. Jay, "Texture Analysis and Classification With Tree-Structured Wavelet Transform," IEEE Transactions on Image Processing, vol. 2, No. 4, Oct. 1993, pp. 429-441.

Randen, Trygve and Husoy, John Hakon, "Segmentation of Text/Image Documents Using Texture Approaches," Proc. NOBIM-konferansen-94 (Asker, Norway), Jun. 1994, pp. 60-67.

Unser, Michael, "Texture Classification and Segmentation Using Wavelet Frames," IEEE Transactions on Image Processing, vol. 4, No. 11, Nov. 1995, pp. 1549-1560.

Courtellemont P.; Olivier, C.; Suzzoni, P. and Lecourtier, Y., "A Method for Acquiring and Modeling Color-Document Images," Proc. 1995 IEEE IECON 21st International Conference, vol. 2, Nov. 1995, pp. 1307-1312.

Smith, John R. and Chang, Shih-Fu, "Local Color and Texture Extraction and Spatial Query," IEEE International Conference on Image Processing (1996), pp. 1011-1014.

Suen, Hong-Ming and Wang, Jhing-Fa, "Color Document Image Segmentation for Automated Document Entry Systems," IEEE TENCON (1996), pp. 131-136.

Porter, Robert and Canagarajah, Nishan, "A Robust Automatic Clustering Scheme for Image Segmentation Using Wavelets," IEEE Transactions on Image Processing, vol. 5, No. 4, Apr. 1996, pp. 662-665.

Zhou, Jianying and Lopresti, Daniel, "Extracting Text from WWW Images," Proc. 4th ICDAR '97 (Ulm, Germany), vol. 1, Aug. 1997, pp. 248-252.

Park, Sang Ho; Yun, Il Dong and Lee, Sang UK, "Color Image Segmentation Based on 3-D Clustering: Morphological Approach," Pattern Recognition 31 (1998), pp. 1061-1076.

Hase, H.; Shinokawa, T.; Yoneda, M., Sakai, M. and Maruyama, H., "Character String Extraction From a Color Document," Proc. 5th International Conference on Document Analysis and Recognition (Bangalore, India), Sep. 1999, pp. 75-78.

Sobottka, K.; Kronenberg, H., Perroud, T. and Bunke, H., "Text Extraction From Colored Book and Journal Covers," International Journal on Document Analysis and Recognition 2 (2000), pp. 163-176.

Deng, Shulan; Latifi, Shahram and Regentova, Emma, "The Effectiveness of Polynomial Wavelets in Text and Image Segmentation," Proc. IS&T/SPIE 12th Annual International Symposium, Electronic Imaging Science 2000 (San Jose, California), vol. 3967, Jan. 2000, pp. 259-266.

* cited by examiner 500
550
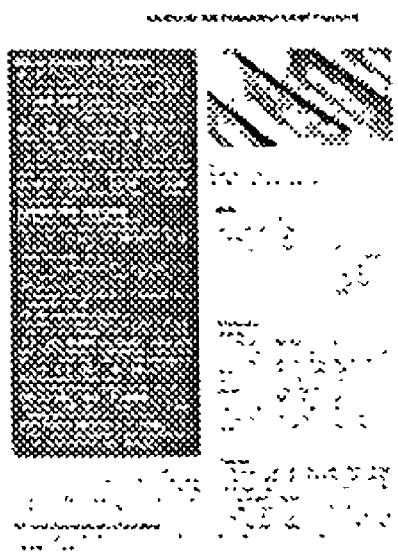
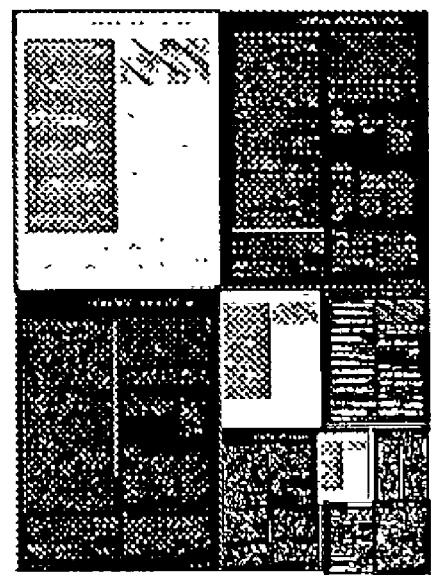
Figure 5A
Figure 5B 600            650

Figure 7A
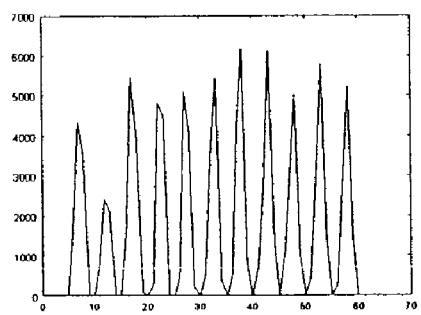
Figure 7B
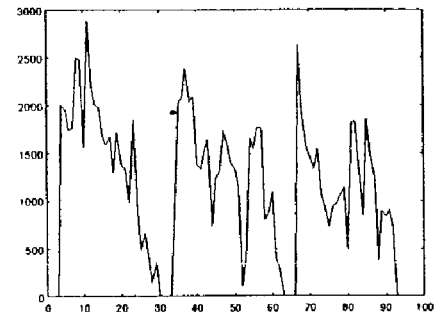
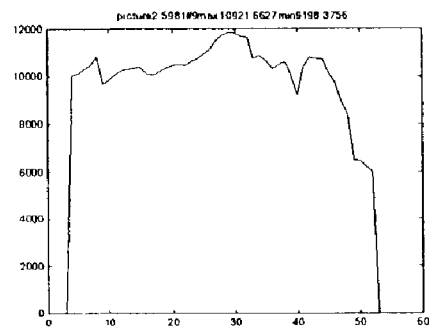
Figure 8A
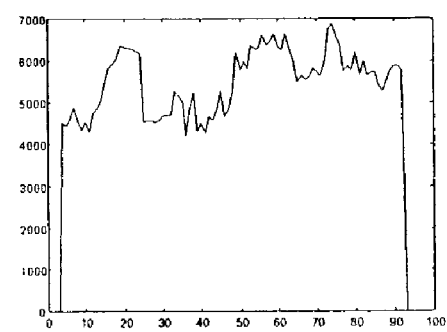
Figure 8B

METHOD OF TEXTURE-BASED COLOR DOCUMENT SEGMENTATION

BACKGROUND OF THE INVENTION

The present invention relates generally to a method for converting an existing paper document into electronic format. More particularly, the invention relates to a method for segmenting an existing document into zones (i.e., regions) of text and halftone.

More and more documents have been produced and/or reproduced in color as the publishing and photo-reproducing techniques have evolved. Recently, documents have been moving rapidly from hard copy format (i.e., paper) to electronic format. With this shift to electronic format, a demand for automatically converting paper documents into electronic format has arisen. Converting the entire paper document to electronic format is inefficient with respect to both the storage requirements and the difficulty in information retrieval. An alternative approach is to separate text regions from graphic regions within the original document and store the two parts differently. The text region can be recognized by optical character recognition (OCR) software, and allows title extraction, information retrieval and indexing of the text region content. To more efficiently translate paper documents to electronic format, document segmentation (i.e., the segmentation of a document into separate text and graphic regions) must be coupled with an OCR process to reduce the processing time by ensuring that the OCR software only operates on actual text regions. Conventional methods of document segmentation operate at the greyscale level and at the binary (i.e., black and white) level of paper documents. However, conventional methods are less than optimal when applied to documents printed in color.

Document image segmentation can be performed using either a top-down approach or a bottom-up approach. Conventional top-down methods split an image alternatively in horizontal and vertical directions using line and character spacing information. Such conventional methods include run length smoothing (which converts white pixels to black pixels if the number of continuous white pixels is less than a predetermined threshold) and the recursive x-y tree method (in which a projection onto horizontal or vertical direction is generated, and then the row and column structure is extracted according to projection histogram valleys corresponding to line spacings). These conventional top-down methods are sensitive to font size and type, character and line spacing, and document orientation.

Conventional bottom-up methods are usually based on connected components. This method starts by connecting parts of each individual character and then uses predetermined standards and heuristics to recognize characters and merge closely spaced characters together. Methods which connect components are time consuming, and sensitive to character size, type, language and document resolution.

One prior art texture-based document image segmentation method is described in a paper by S. Park, I. Yun and S. Lee entitled "Color Image Segmentation Based on 3-D Clustering Approach" that appeared in the August, 1998 issue of the journal PATTERN RECOGNITION. This method assumes two types of textures and separates text and graphics using a Gabor filter and clustering.

Most of the conventional methods operate only on a monochrome image and assume black characters on white background. Color document images are more complicated than such monochrome images since they typically have a complex background of varied colors and patterns, and a more complicated page layout. Further, homogenous colors observed by human vision actually consist of many variations in the digital color space, which further complicates processing and analysis of the color documents.

Accordingly, it is the object of the present invention to provide an improved method for segmenting a color document into text and graphic regions that overcomes the drawbacks of the prior art.

SUMMARY

It has now been found that these and other objects are realized by a method that classifies a scanned page into text regions and halftone regions based on the textural differences of the various text regions and halftone regions within a color document.

In particular, the method of the present invention applies a color space transform to a digitized color document. A texture identification step is applied to get texture information about the digitized color document, and then a noise reduction step is then preferably used to clean up any noise generated by the texture identification step. Bounding boxes within the digitized color document are then identified, and then the region within each bounding box is classified as either text or halftone.

In a first embodiment, the texture identification step is performed by applying a windowing operation to an intensity image generated from the digitized color document. The windowing operation steps the window across the intensity image and examines the minimum and maximum intensity values within the window at each point. A mask is initialized that corresponds to the intensity image and which has all bit positions set to one. If the difference between the minimum and maximum intensity values is less than a predetermined amount, all of the bits in the current window position in the mask are set to zero. Finally, after moving the mask across the entire image, the mask is applied to the digitized color document. Preferably, if connected components are not found by performing the windowing operation on the intensity image, the windowing operation can be performed on a color difference image generated from the digitized color document. Furthermore, the order of these operations may be swapped, and the windowing operation may also be performed solely on the color difference image.

In the second embodiment, the texture identification step is performed by applying a wavelet transform to the digitized color document, and then apply a Fuzzy K-Mean clustering steps to the transformed digitized color document.

Two methods of performing bounding box identification are described, a first method based on identifying run lengths and a second method based upon a sequential can labeling algorithm.

Finally, the classification step is based upon an examination of the periodicity of a histogram generated from a bounding box. In particular, the bounding box is first scanned horizontally to generate a horizontal histogram, which is then examined to determine if it contains a periodic waveform. If so, the bounding box is considered to be text. If not, preferably a vertical histogram is generated, and if it contains a periodic waveform, the bounding box is also considered to be text. If the horizontal and vertical histograms both do not contain any periodicity, then the bounding box is considered to be halftone. These operations may be swapped, with the vertical histogram being generated and analyzed first, and only one operation (horizontal or vertical) may be applied.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein:

FIG. 5A is an original image and FIG. 5B is a first sample representation of texture decomposition using wavelet subbands in the method of the present invention applied to FIG. 5A;

FIG. 7A is a histogram of a horizontal text region, and FIG. 7B is a histogram of a vertical region;

FIG. 8A is a histogram of a horizontal halftone region, and FIG. 8B is the histogram of a vertical halftone region;

DETAILED DESCRIPTION OF THE INVENTION

The present invention is a method of segmenting color documents based upon the less time consuming top-down approach. The method of the present invention is based on the fact that the texture of text and halftone regions are generally distinguishable. A text region has horizontal or vertical elements than a halftone region which generally has no pattern. In other words, text regions have a more homogeneous image texture than halftone regions in a document. The method of the present invention employs two alternative methods to capture the orientation and frequency feature of the texture of regions within a document.

Figure 1:
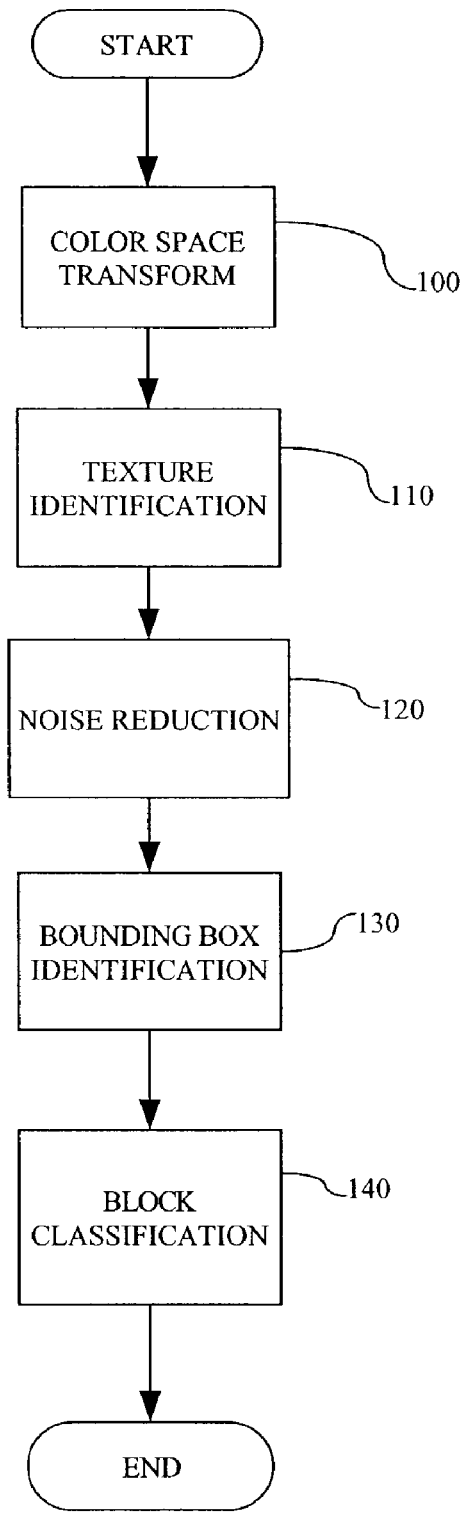
FIG. 1 is a flowchart of the texture identification method of the present invention.

Referring now to the drawings, and in particular to the flowchart of FIG. 1, the preferred method of color document segmentation of the present invention takes into account both color and texture as the statistical properties. The RGB (red, green, and blue) color space is first preferably transformed into an HSV (hue, saturation, and intensity value) color space to best distinguish color features (step 100). Next, texture features are obtained for each color channel (step 110). Thereafter, an optional noise reduction step (step 120) is applied. Next, a bounding box (i.e., block) identification (130) step is applied to extract separate regions within the color document. Finally, the text regions are separated from the halftone regions (step 140). These steps are described in greater detail below with respect to the two embodiments of the present invention.

With respect to step 100 of FIG. 1, to best use the color information from the underlying document, it is preferable to select the optimum color space representation. Although the RGB color format is the most common color format for digital images, is natural for human eyes, and is compatible with computer displays, the RGB color space representation is not optimized for color quantization or segmentation purposes because it is not perceptually uniform. Other color spaces known to those of skill in the art, such as YUV, NTSC and HSV, are popular alternatives. Among them, the HSV (hue, saturation and color value) space is preferably used in the method of the present invention because its features provide a powerful tool for image feature extraction and segmentation.

To transform the RGB space to the HSV space (step 100), first let (r, g, b) be the tuple describing a color point in RGB space and (h, s, v) be the transformed tuple in HSV space. For $(r,g,b) \in [0,1]$, $(h,s,v) \in [0,1]$ can be obtained from $(r, g, b)$ according to the following pseudocode:

v=max(r,g,b), d=max(r,g,b)−min(r,g,b)
if v !=0 s=d/v
else s=0
if s==0 h=0
else
r1=(v−r)/d, g1=(v−g)/d, b1=(v−b)/d
if r==v h=(g−b)/d
else if g==v h=2+(b−r)/d
else if b==v h=4+(R)−g)/d
if h<0 h=h+6
h=h/6

The HSV color space can be visualized as a cone. The long axis of the cone represents value, from blackness to whiteness. The distance from the axis of the cone represents saturation, i.e., the amount of color present. The angle around the axis is the hue, i.e., the tint or tone.

Two alternative methods are used to perform texture identification step 110 of FIG. 1. In the first and presently preferred method discussed below with respect to FIGS. 2 and 3, a windowing operation is applied to the intensity image (and/or to the color difference image) generated from the original document, and the entire window is converted based upon the range of intensity values (and/or color difference values) within the window. In particular, for operations on the intensity image, for example, where the range of intensity values is less than a predetermined value, the values within the window are set to zero and otherwise they remain set to one (as initialized). In the second method, discussed with respect to FIG. 4, a wavelet transform is applied to the image, and fuzzy K-mean clustering is performed to the transformed image to group pixels having feature vectors close to one another in the feature space into blocks.

The noise reduction step 120 of FIG. 1 is optionally performed in both embodiments to remove any noise generated by the prior steps. This noise may be in the form of small unconnected regions and irregular spacings between different perspective regions. As a result, preferably, post processing is performed at step 120 to clean up this noise. In particular, step 120 preferably consists of an opening step used to remove small segments and to cut weakly linked regions into separate zones for later discrimination. For a document having k blocks of regions, the opening step is applied to each block. This opening step is defined as an erosion step followed by a dilation step, where the erosion, dilation, and opening steps are defined as follows:

Erosion—For each binary object pixel (with value "1") that is connected (by a mask B) to a background pixel, set the object pixel value to "0", i.e., E(A, B).

Dilation—For each binary object pixel (with value "1"), set all background pixels (with value "0") surrounding the object pixel (by mask B) to the value "1", i.e., D(A, B).

Opening—An erosion step followed by a dilation step, i.e., O(A, B)=D(E(A, B),B).

Referring now to step 130 of FIG. 1, a set of regions for each block is obtained (also called "connected component identification"). In order to consider each region individually, it is necessary to separate and extract the regions associated with each block to identify all connected components. Conventionally, the connected components based method is one of the bottom-up approaches employed in document segmentation, but has been found to be resolution sensitive and time consuming. In the method of the present invention, however, the connected component method is used only as a supplemental tool and, because it is only used on larger region blocks as opposed to individual characters in the bottom-up approach, it does not suffer from the previously identified deficiencies when used in accordance with the present invention. Two alternative methods for labeling the connected components are described herein. The first and presently preferred method of labeling the connected components is based upon the method of identifying connected components based upon run lengths that is disclosed in pending U.S. patent application Ser. No. 09/773,214, entitled "Run Length Based Connected Components and Contour Following For Enhancing the Performance of Circled Region Extraction Algorithm." In this method, run length processing first scans the image in a predetermined scan order. For illustration purposes, it will be assumed that the scan order is from top to bottom and from left to right to identify and correlate groups of adjacent pixels that define a linear string termed a run or run length. The scanning process groups pixels of a predetermined state together to form run lengths within the image.

Individual pixels are identified as a run length if they occupy contiguous pixel locations within a given row. To accommodate slight imperfections and data dropout in the image, the algorithm can be configured to ignore single pixels (or more) of the incorrect state within a potential run length. This may be done through preprocessing or on the fly as the scanning algorithm performs its other tasks. In effect, if a single white pixel is encountered in what would otherwise be a complete run length, the algorithm can treat that pixel as if it were a black pixel, thereby assigning it to the run length, provided the white pixel is neighbored on both sides by black pixels.

The scanning algorithm and its associated data structure defines a hierarchy among run lengths. The hierarchy is termed a parent-child-sibling hierarchy. A parent-child relationship exists where two run lengths have one or more adjacent pixels of predetermined common state (e.g., black) in a given column. The parent run length is in the row scanned first, and the child is in the subsequently scanned row. A sibling is a second run length in the same row as the child that also shares one or more adjacent pixels of predetermined common state (e.g., black) in a given column with the parent. The scanning algorithm automatically detects the parent-child-sibling relationships and stores them in a data structure. Preferably, the data structure defines each run length by its associated x-minimum value, x-maximum value and y coordinate value. The data structure also has a parent pointer, child pointer and sibling pointer, which collectively are used to establish a linked list of the run length data structures.

Once the data structure has been populated by applying the scanning process to the document, the connected component retrieval process is performed. This processing makes use of the parent, child and sibling information obtained and stored during the scanning process. In particular, starting with the run length occupying the upper leftmost corner, as determined by its x-minimum, x-maximum and y-coordinate values, it is first determined if this run length has a child, and if so, the child becomes the current run length. If no child is found, it is determined if this run length has a sibling, and if so the sibling becomes the current run length. This processing continues recursively until no child or sibling relationships are found, at which point a parents to the current run length haven a given minimum run length are located. Likewise, this processing continues recursively until no parent is found, and then children or siblings are located, until no attached run length remains. This entire linked structure represents one connected component. The processing is repeated within the image until every connected component within the image is located.

The second method for labeling of the connected components is conventional. In particular, a sequential scan labeling algorithm is used. The following pseudocode defines how this algorithm is implemented:

| First Scan | |
| --- | --- |
| if A = O | do nothing |
| else if D labeled | copy label to A |
| else if (not B labeled) and (not C labeled) | increment label numbering and label A |
| else if B xor C labeled | copy label to A |
| else if B and C labeled | |
| if B label = C label | copy label to A |
| else | copy either B label or C label to A and record equivalence of labels |

Second Scan clean up the label equivalencies, giving each connected component in the image a unique label Finally, at step 140, each region (block) is classified as one of three categories: 1. background; 2. text; or 3. halftone. The background (or smooth) regions can be identified using mean and variance values for region, and can be identified prior to the processing related to the identification of text or halftone regions. To identify the text or halftone regions, a histogram-based algorithm is applied to the intensity pixels corresponding to each specific region. Each region is scanned line by line to get an accumulated intensity value of all the pixels along the line. Because text regions have text lines and spacing that occur at a regular interval, these regions have very a regular and periodic histogram profile pattern which is very different from the histogram profile for halftone regions. Each region is scanned horizontally and vertically because the direction of scanning is not known a priori. The region will be classified as a text region if it has regular and periodic histogram profile pattern in either orientation, otherwise it will be classified as a halftone region. The block classification step 140 is discussed in further detail below with respect to FIGS. 7A, 7B, 8A, 8B and 9.

Figure 2:
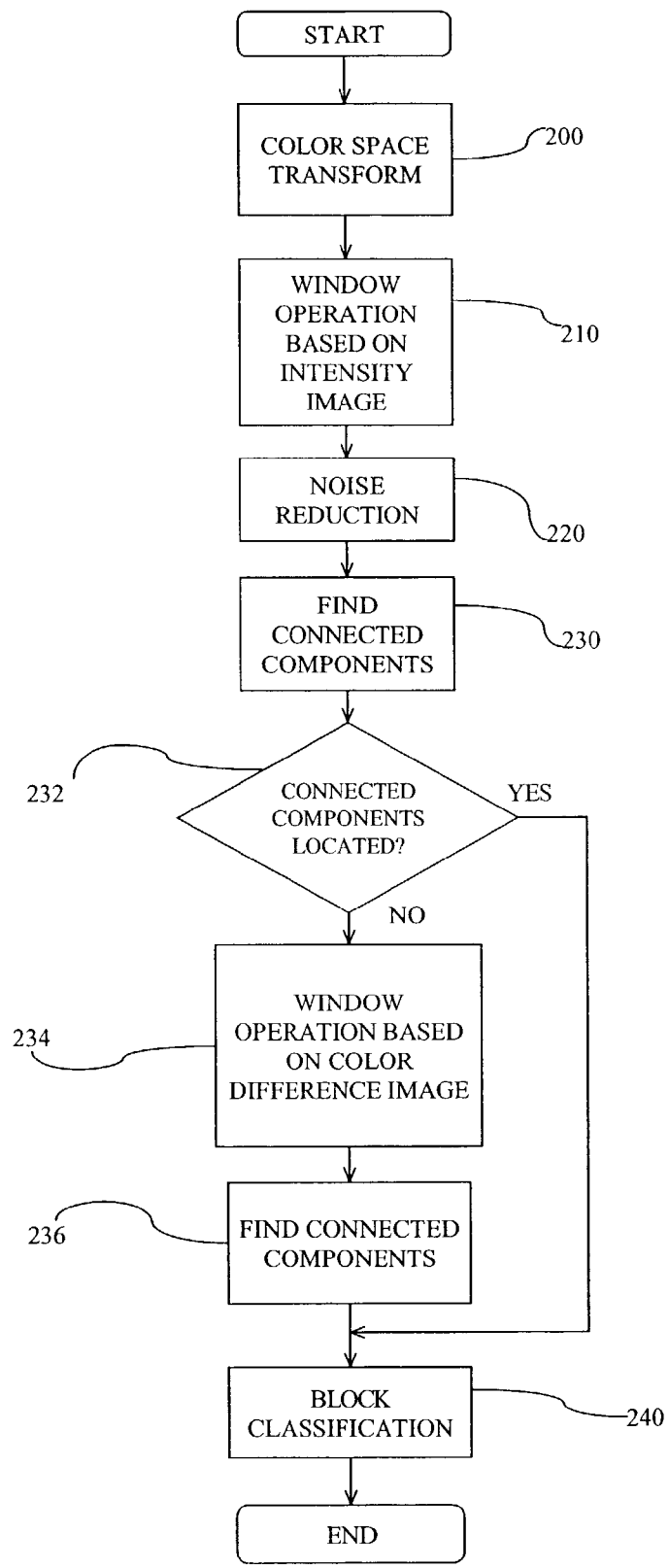
FIG. 2 is a flowchart of a first embodiment of the texture identification method of FIG. 1.

Referring now to FIG. 2, the color space transform step 200, the optional noise reduction step 220, the find connected component step 230 and the block identification step 240 are the same as steps 100, 120, 130 and 140 of FIG. 1. In the first presently preferred embodiment, shown in the flowchart of FIG. 2, the texture identification step 110 of FIG. 1 is performed by a windowing operation applied to the intensity image generated from the original document. The windowing operation is described in detail with respect to FIG. 3 below. Furthermore, in this preferred embodiment, a second windowing operation based upon the color difference image may also be performed, step 234 in FIG. 2, if no connected components are found at step 232 after performing the first windowing operation based upon the intensity image step 210 and followup steps 220 and 230. As one of skill in the art will readily recognize, as an alternative method, windowing operations may be simultaneously applied to an intensity image and a color difference image, with the results combined prior to block classification, instead of first performing an operation on the intensity image and then performing an operation on the color image, as described above. Also, one of skill will readily recognize that alternatively a window operation based solely on the color difference image may be performed, or a first window operation based upon the color difference image and a second window operation based upon the intensity image may be performed. The color difference image is calculated by determining the differences between the hue, saturation and color values for adjacent pixels. In particular, the color difference value for a pixel P1 having hue, saturation, and color values of h1, s1 and v1 and the adjoining pixel (e.g., to the right) P2 having hue, saturation, and color values of h2, s2 and v2 is calculated according to the following formula:

$$P1 = (h2-h1)^2 + (s2-s1)^2 + (v2-v1)^2 \quad (1)$$

Figure 3:
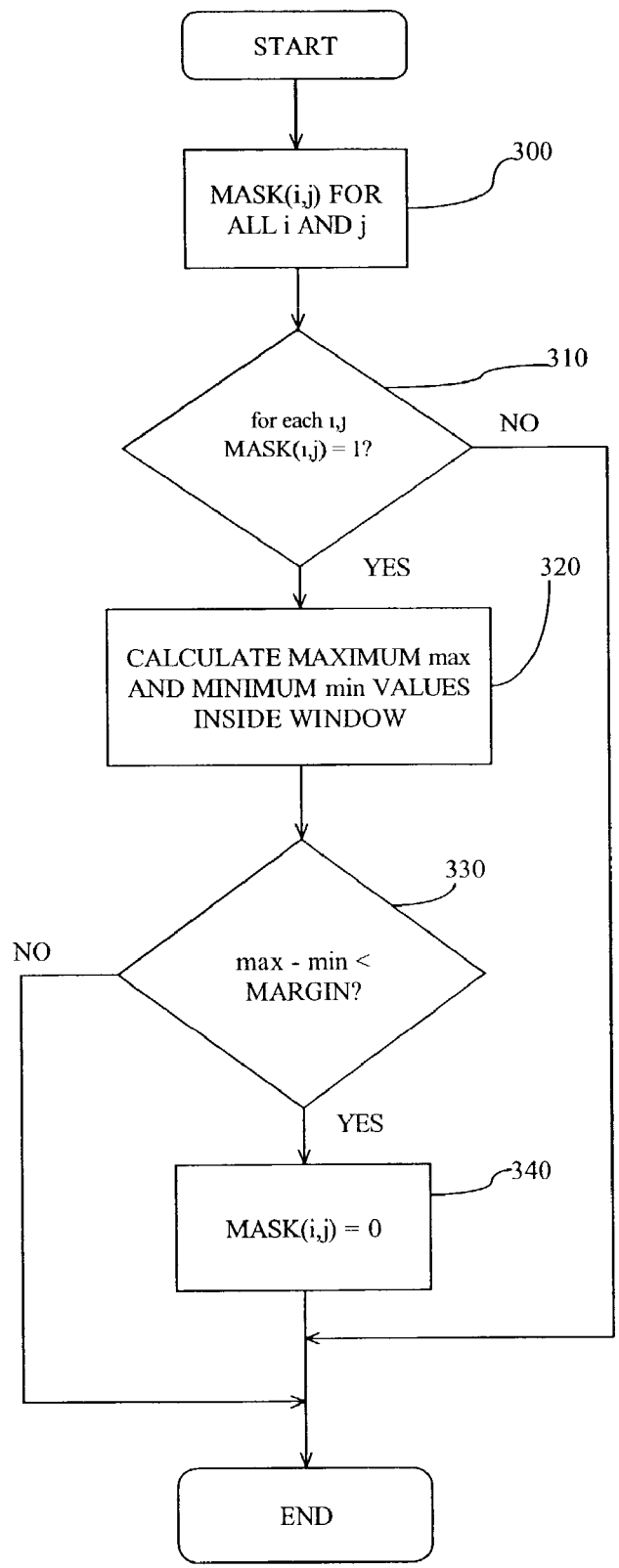
FIG. 3 is a flowchart of the window steps of FIG. 2.

Referring now to FIG. 3, the windowing operation starts by masking the intensity (or color difference) image for window of size i, j at step 300 and then ensuring that the present window is non-zero at step 310 (otherwise processing moves to the next pixel). At step 320, the maximum and minimum intensity values within the window, i.e., max and min, are calculated. Then at step 330, it is determined if the difference between the maximum and minimum values is less than a predetermined value, i.e., MARGIN. If so, all of the values within the window are set to zero at step 340, otherwise, the values remain as originally set, and processing moves to the next pixel.

Figure 4:
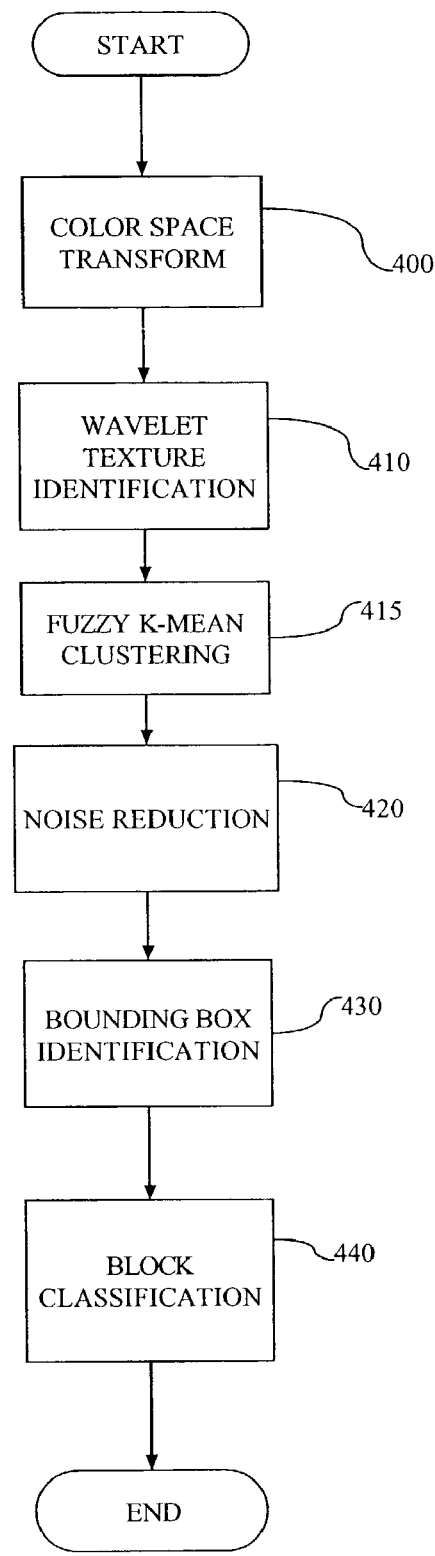
FIG. 4 is a flowchart of a second embodiment of the texture identification method of FIG. 1.

With respect to the second embodiment of the present invention shown in FIG. 4, steps 400, 420, 430 and 440 are identical to steps 100, 120, 130 and 140 of FIG. 1, respectively. Only step 410 is performed differently. First, a conventional wavelet transform is applied to the document. There are no formal standards to determine the best wavelet. Referring now to FIGS. 5A and 5B, a sample image 500 (FIG. 5A) is processed using a three-level decomposition in FIG. 5B. For the purposes of the example shown in FIG. 5B, the conventional Daubechies 3 wavelet was selected.

Referring now to step 415 of FIG. 4, the fuzzy k-mean clustering technique is used to group pixels with similar feature vectors that are close to one another in the feature space. As a result of this processing, k clusters of feature data points, which depicts perceptually different regions in the image, are generated. Each cluster can be represented by the mean feature vector of all its fuzzy members as a cluster center. To obtain good segmentation, the members of each cluster should be as close to the cluster center as possible, and the cluster centers should be well separated. In particular, the fuzzy k-mean clustering algorithm can be described as follows:

1. Initial fuzzy partition: randomly generate a fuzzy partition (i.e., a membership function) matrix U that is k×n, where k is number of clusters and n is number of data points and where the summation of each column of the generated U is equal to 1;
2. The center of each cluster is then recalculated as the mean feature vector of all the fuzzy members within the cluster;
3. The Euclidean distance between each data point and all cluster centers is calculated and the membership function matrix U is updated according to the distance of each data point to cluster centers, with the objective function to be the summation of the distance;
4. Repeat step 2 and 3 until the objective function converges so that the resultant membership function matrix U reflects the fuzzy cluster, with each data point being classified into the cluster with maximum membership probability.

Figure 6A:
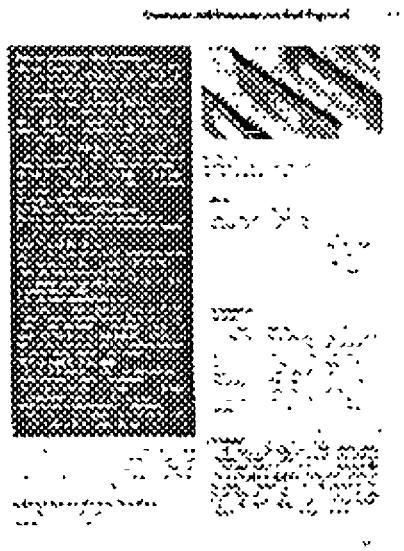
FIG. 6A is an original image and FIG. 6B is a representation of the result of texture identification of FIG. 6A using the method of the present invention.
Figure 6B:
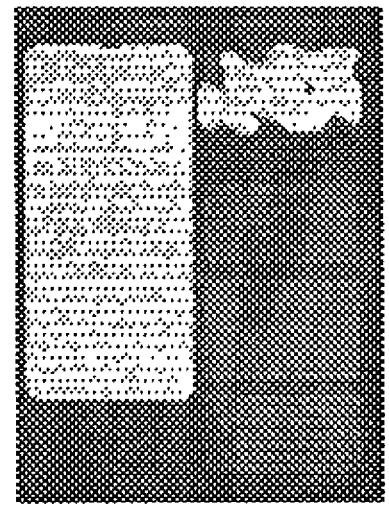

In summary, the true cluster number is determined by calculating the within-cluster distance for each cluster n. The within-cluster distance is given by the sum of the distances of every pixel's feature vector from its associated cluster center. This distance decreases as the number of clusters increases, and the final cluster number is chosen to be the point at which the within-cluster distance becomes approximately constant (i.e., the within-cluster distance does not change significantly between iterations of step 4 above). In FIG. 6A, a sample document is shown prior to the clustering step, and in FIG. 6B, the same sample document is shown after the clustering step was applied.

To further understand the block classification step 140 of FIG. 1, referring now to FIGS. 7A and 7B, it can be seen that a periodic profile pattern appears in histogram 700 of FIG. 7A, which corresponds to scanning of a text region in the horizontal direction. A periodic profile also appears in histogram 750 of FIG. 7B, which corresponds to the scanning of a text region in the vertical direction. In contradistinction, histogram 800 of FIG. 8A and histogram 850 of FIG. 8B, which correspond to the scanning of a halftone region in the horizontal and vertical directions, respectively, do not have any periodic patterns therein. As a result, it can be seen that blocks may be classified as text or halftone based upon whether there is a periodic profile pattern found in a histogram based upon he scanning of that block.

Figure 9:
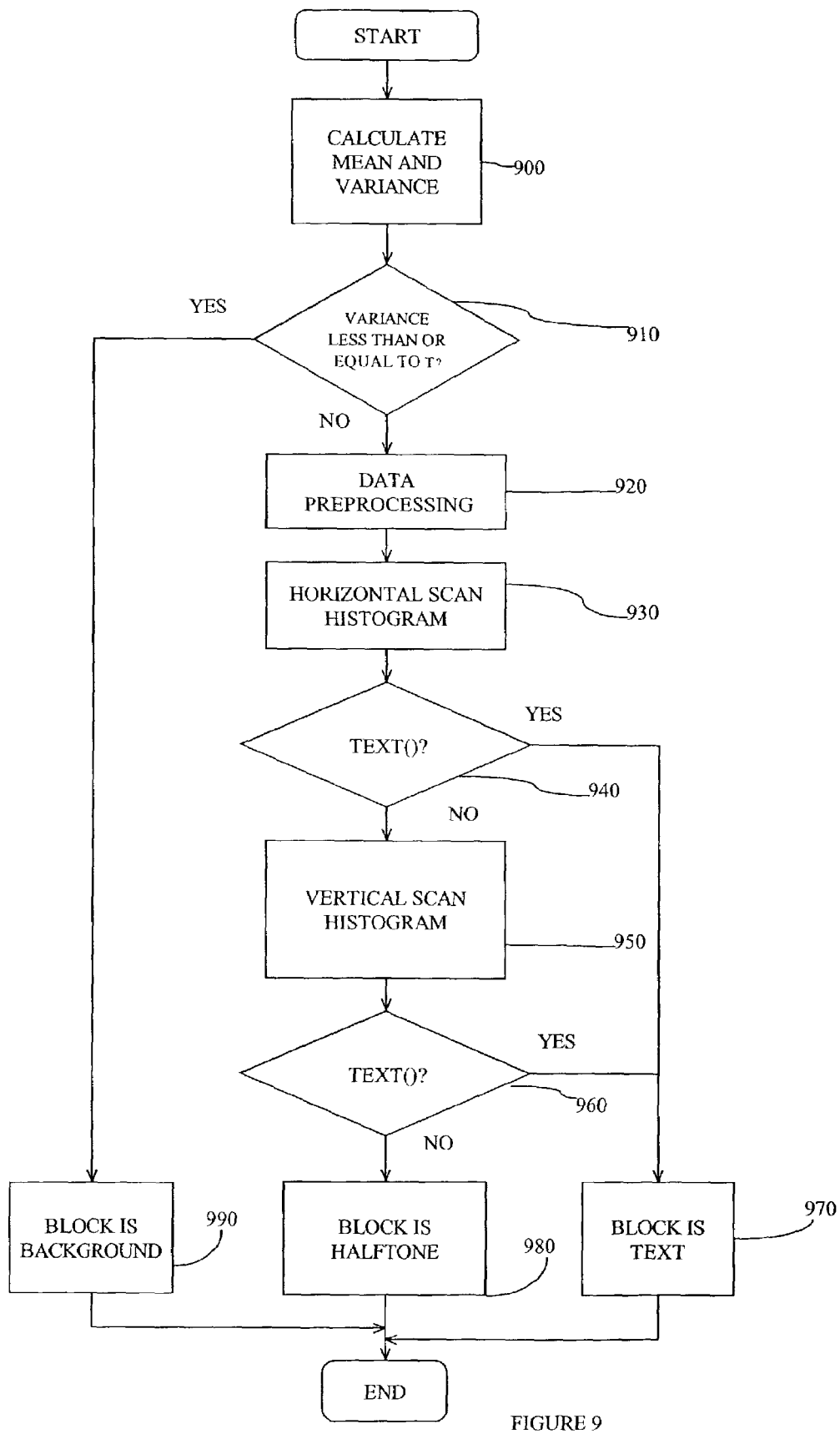
FIG. 9 is a flowchart of the text and halftone discrimination method of the invention.
Figure 10B:
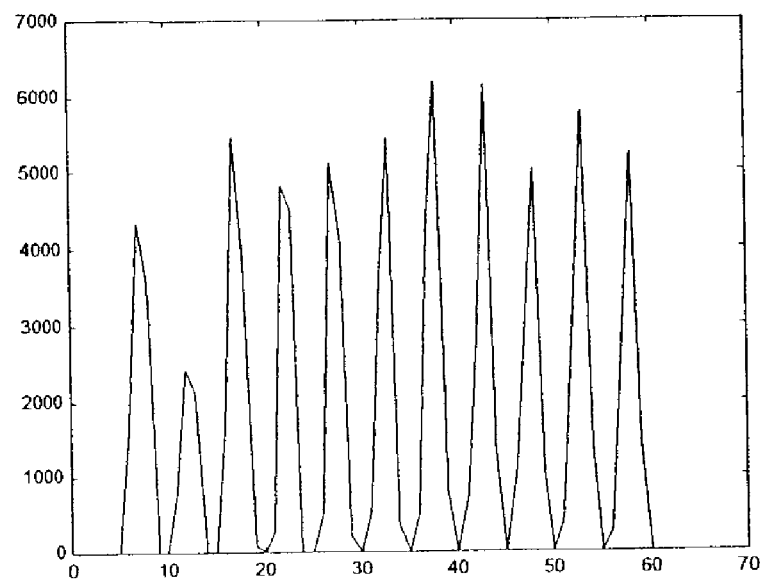
FIG. 10B is a histogram of the same text region after having its pixels inverted.
Figure 10A:
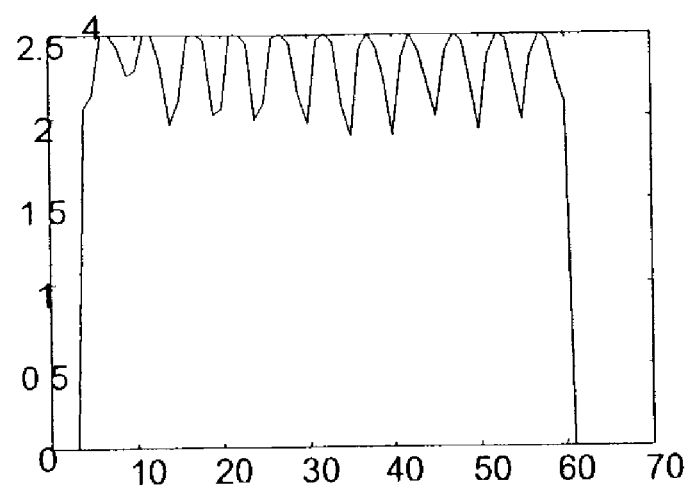
FIG. 10A is a histogram of a text region having a homogeneous background.

Referring now to the flowchart of FIG. 9, the steps performed in identifying regions as background, text or halftone are shown. First, at step 900, the mean and variance of each region calculated. If the variance is found to be less than a predetermined threshold T at step 910, it is classified as background at step 990 as discussed above. Otherwise, the region is considered text or halftone and processing continues at step 920, where the data preprocessing step is performed. In certain instances, a homogenous background can cause problems in identifying the periodic patterns in the histograms, as shown in FIG. 10A. As a result, the data preprocessing step makes the process more robust by inverting the pixel values in each region when there is a light (and thus homogenous) background, which results in the histogram shown in FIG. 10B. Processing proceeds to step 930, where each region is scanned horizontally and a histogram is generated for all rows of each region. Thereafter, the horizontal histogram is examined to determine whether it contains a periodic pattern at step 940. If a periodic pattern is found, that region is classified as a text region at step 970. For those regions which are not identified as text by step 940, a vertical histogram is preferably generated for each column in each remaining region at step 950. Finally, at step 960, the vertical histogram is preferably examined to determine whether it contains a periodic pattern. If a periodic pattern is found, that region is classified as a text region at step 970 and if a periodic pattern is not found, that region is classified as a halftone region at step 980. As one of skill will readily recognize, the order of processing may be reversed, i.e., a vertical histogram and its associated processing may be performed prior to generating the horizontal histogram, and further, to save processing time, only a horizontal or vertical histogram may be generated to determine if the region contains a periodic pattern To identify the periodic patterns in histograms which indicate the current region is a text region, it is important to ensure that the intervals between local minimums and maximums are approximately regular. Further, it should be assumed that text mainly appears in clusters of lines having similar line spacing, and therefore the local maximums correspond to text line and the local minimums correspond to line spaces. In addition, the difference between the mean (or median) values of local maximum and local minimum should be significant, which corresponds to the difference between text lines and space values. Finally, noise must be considered when examining the histograms.

As an additional step after the preprocessing step 920 of FIG. 9, it is possible to examine the boundaries of each region and identify those regions found to be rectangular as halftone, to reduce the amount of processing in steps 930–960.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A method for segmenting a digitized document into regions of halftone and text, comprising the steps of:
   generating an intensity image of said digitized document;
   identifying a texture of said digitized document by performing a windowing operation on said intensity image, said windowing operation comprising the additional steps of:
      generating a mask corresponding to said intensity image consisting of bits having a first state,
      moving a window of predetermined dimensions across said intensity image,
      for each window position, calculating a maximum intensity value and a minimum intensity value of an area of said intensity image corresponding to said window and converting all bits within an area of said mask corresponding to said window position to a second state if the difference between said maximum intensity value and said minimum intensity value is less than a predetermined value, and
      generating a modified intensity image by applying said mask to said intensity image;
   identifying bounding boxes within said digitized document representing regions of either halftone or text based upon said texture of said digitized document; and
   classifying said regions within said bounding boxes as either halftone or text.

2. The method of claim 1, further comprising the step of applying a color space transform to said digitized document prior to said step of generating an intensity image of said digitized document.

3. The method of claim 1, further comprising the step of applying noise reduction to said modified intensity image prior to said step of identifying bounding boxes.

4. The method of claim 1, in which said classifying step comprises the additional steps of:
   classifying said regions within said bounding boxes as text if a periodic pattern appears in a histogram generated by scanning each bounding box horizontally or vertically; and
   classifying said regions within said bounding boxes as halftone if a periodic pattern does not appear in a histogram generated by scanning each bounding box horizontally or vertically.

5. A method for segmenting a digitized document into regions of halftone and text, comprising the steps of:
   generating an color difference image of said digitized document;
   identifying a texture of said digitized document by performing a windowing operation on said color difference image, said windowing operation comprising the additional steps of:
      generating a mask corresponding to said color difference image consisting of bits having a first state;
      moving a window of predetermined dimensions across said color difference image;
      for each window position, calculating a maximum color difference value and a minimum color difference value of an area of said color difference image corresponding to said window and converting all bits within an area of said mask corresponding to said window position to a second state if the difference between said maximum color difference value and said minimum color difference value is less than a predetermined value; and
      generating a modified color difference image by applying said mask to said color difference image;
   identifying bounding boxes within said digitized document representing regions of either halftone or text based upon said texture of said digitized document; and
   classifying said regions within said bounding boxes as either halftone or text.

6. The method of claim 5, further comprising the step of applying a color space transform to said digitized document prior to said step of generating a color difference image of said digitized document.

7. The method of claim 5, further comprising the step of applying noise reduction to said modified color difference image prior to said step of identifying bounding boxes.

8. The method of claim 5, in which said classifying step comprises the additional steps of:
   classifying said regions within said bounding boxes as text if a periodic pattern appears in a histogram generated by scanning each bounding box horizontally or vertically; and
   classifying said regions within said bounding boxes as halftone if a periodic pattern does not appear in a histogram generated by scanning each bounding box horizontally or vertically.

9. A method for segmenting a digitized document into regions of halftone and text, comprising the steps of:
   identifying a texture of said digitized document;
   identifying bounding boxes within said digitized document representing regions of either halftone or text based upon said texture of said digitized document;
   classifying said regions within said bounding boxes as text if a periodic pattern appears in a histogram generated by scanning each bounding box horizontally or vertically; and
   classifying said regions within said bounding boxes as halftone if a periodic pattern does not appear in a histogram generated by scanning each bounding box horizontally or vertically.

10. The method of claim 9, wherein said texture identifying step comprises the steps of:
  generating an intensity image of said digitized document; and
  identifying a texture of said digitized document by performing a windowing operation on said intensity image, said windowing operation comprising the additional steps of:
    generating a mask corresponding to said intensity image consisting of bits having a first state,
    moving a window of predetermined dimensions across said intensity image,
    for each window position, calculating a maximum intensity value and a minimum intensity value of an area of said intensity image corresponding to said window and converting all bits within an area of said mask corresponding to said window position to a second state if the difference between said maximum intensity value and said minimum intensity value is less than a predetermined value, and
    generating a modified intensity image by applying said mask to said intensity image.

11. The method of claim 10, further comprising the step of applying a color space transform to said digitized document prior to said step of generating an intensity image of said digitized document.

12. The method of claim 10, further comprising the step of applying noise reduction to said modified intensity image prior to said step of identifying bounding boxes.

13. The method of claim 9, wherein said texture identifying step comprises the steps of:
  generating an color difference image of said digitized document; and
  identifying a texture of said digitized document by performing a windowing operation on said color difference image, said windowing operation comprising the additional steps of:
    generating a mask corresponding to said color difference image consisting of bits having a first state;
    moving a window of predetermined dimensions across said color difference image;
    for each window position, calculating a maximum color difference value and a minimum color difference value of an area of said color difference image corresponding to said window and converting all bits within an area of said mask corresponding to said window position to a second state if the difference between said maximum color difference value and said minimum color difference value is less than a predetermined value; and
    generating a modified color difference image by applying said mask to said color difference image.

14. The method of claim 13, further comprising the step of applying a color space transform to said digitized document prior to said step of generating a color difference image of said digitized document.

15. The method of claim 13, further comprising the step of applying noise reduction to said modified color difference image prior to said step of identifying bounding boxes.

16. The method of claim 9, wherein said texture identifying step comprises the steps of:
  performing a wavelet transform on said digitized document; and
  applying Fuzzy K-Mean clustering to said transformed digitized document.

17. The method of claim 16, further comprising the step of applying a color space transform to said digitized document prior to said step of performing a wavelet transform on said digitized document.

18. The method of claim 16, further comprising the step of applying noise reduction to said transformed digitized document prior to said step of identifying bounding boxes.

* * * * *